United States Patent [19]
Bergstrom

[11] Patent Number: 4,889,223
[45] Date of Patent: Dec. 26, 1989

[54] DISTRIBUTION-TRANSFERRING DEVICE FOR ARTICLES TO BE CONVEYED INCORPORATED IN A CONVEYER

[75] Inventor: Anders Bergstrom, Lund, Sweden

[73] Assignee: AB Tetra Pak, Osaka, Japan

[21] Appl. No.: 155,308

[22] Filed: Feb. 12, 1988

[30] Foreign Application Priority Data

Feb. 19, 1987 [JP] Japan .............................. 62-23686[U]

[51] Int. Cl.⁴ ............................................. B65G 47/10
[52] U.S. Cl. ...................................... 198/364; 198/442
[58] Field of Search ............... 198/360, 364, 365, 370, 198/371, 445, 569, 362, 442, 367

[56] References Cited

U.S. PATENT DOCUMENTS

| | | | |
|---|---|---|---|
| 1,168,865 | 1/1916 | Drake | 198/364 X |
| 1,495,459 | 5/1924 | Thompson | 198/364 X |
| 2,063,431 | 12/1936 | Grayson et al. | 198/364 X |
| 2,437,214 | 3/1948 | Tremblay | 198/364 X |
| 2,743,826 | 5/1956 | Aschenwald | 198/364 X |
| 2,868,245 | 1/1959 | Ernst | 198/367 X |
| 3,153,477 | 10/1964 | Tipton | 198/364 |
| 3,334,725 | 8/1967 | Wardlaw et al. | 198/364 |
| 4,703,844 | 11/1987 | Jahns | 198/367 |

FOREIGN PATENT DOCUMENTS 694344 9/1964 Canada ............................. 198/364

Primary Examiner—Frank E. Werner
Assistant Examiner—James R. Bidwell
Attorney, Agent, or Firm—Koda & Androlia

[57] ABSTRACT

A device for distributing and transferring articles including a plurality of branch conveyers arranged parallel to one another and disposed near the terminating end of a main conveyer which continuously transfers articles of a predetermined shape. The branch conveyers are located beneath the main conveyer at right angles to the main conveyer with the truck lines being spaced and closely adjoined to one another. An article receiving inlet faces the traversing direction of the main conveyer and is disposed before the terminating end of the traversing truck of the main conveyer and a distribution unit equipped with a traversing direction change-over member guides the articles in a direction at right angles to the traversing direction and a chute in combination with the traversing direction change-over member feeds the articles onto the traversing surface of a desired branch conveyer. The distribution unit is movable parallel to the main conveyer so that the chute can be positioned above the desired branch conveyer and the articles fed thereon.

6 Claims, 3 Drawing Sheets

DISTRIBUTION-TRANSFERRING DEVICE FOR ARTICLES TO BE CONVEYED INCORPORATED IN A CONVEYER

BACKGROUND OF THE INVENTION

1. Field of the Invention

The present invention relates to a device for distributing and transferring articles of a predetermined shape (generally packaging containers of a longitudinal prism shape), which are conveyed one after another on a traveling conveyer to other conveyers in accordance with the required final processing.

2. Prior Art

Conventionally, articles of a predetermined shape, such as packaging containers which are brick, gable-topped shape or having arched side walls containing liquid foodstuff such as milk, juice, yogurt are transferred from a main conveyer to other branch conveyers according to the required final processing (such as attaching a small bag having a straw or spoon to the articles, gathering a predetermined number of the articles in a paper-framed tray or shrink-wrapping). The articles are transferred from a main conveyer to other branch conveyers by respective transferring means which vary depending upon the particular required processing so that the articles are separated to a particular branch conveyer.

In such a conventional device, it is necessary for the main conveyer to be provided with a number of transferring means equal to the number of final processes. This requires a large amount of space for installation of conveyers causing a variety of problems such as high equipment inventments for the transferring means.

SUMMARY OF THE INVENTION

The purpose of the present invention is to provide a distribution-transferring device which solves the aforementioned problems by making it possible to effectively distribute articles to many branch conveyers.

In the present invention, a plurality of branch conveyers having flat traversing surfaces and arranged in parallel with relation to one another are disposed under the terminating end of the traversing truck of a main conveyer which also has a flat traversing surface and is designed to continuously convey articles of a predetermined shape such that the directions of the traversing trucks of the branch conveyers at the starting end thereof intersect at right angles to the traversing direction of the main conveyer with the truck lines spaced and closely adjoined to one another. An article receiving inlet faces the traversing direction of the main conveyer is disposed before the terminating end of the traversing truck of the main conveyer. A distribution unit is equipped with a traversing direction changeover member which guides the articles at right angles to the traversing direction, and a chute is provided which, in combination with the traversing direction change-over member, allows the articles to be fed onto the traversing surface of any of a plurality of branch conveyers such that the distribution unit is movable parallel to terminating end of the traversing truck of the main conveyer for the distance wherein the afore-mentioned branch conveyers are disposed.

In the present invention, articles normally standing on the conveyer are conveyed one at a time to be distributed in accordance with the required final processing. The distribution unit moves in compliance with the required final processing and the chute of the distribution unit is positioned above one of the desired branch conveyers which are in turn positioned under the area before the terminating end of the traversing truck. The articles on the conveyer which are fed from the article receiving inlet of the traversing direction change-over member and are turned 90 degrees so that they slide down the chute and are smoothly transferred to the desired branch conveyer for final processing.

BRIEF DESCRIPTION OF THE DRAWINGS

The drawings illustrate an embodiment in accordance with the teachings of the present invention, wherein.

DETAILED DESCRIPTION OF THE INVENTION

Figure 1:
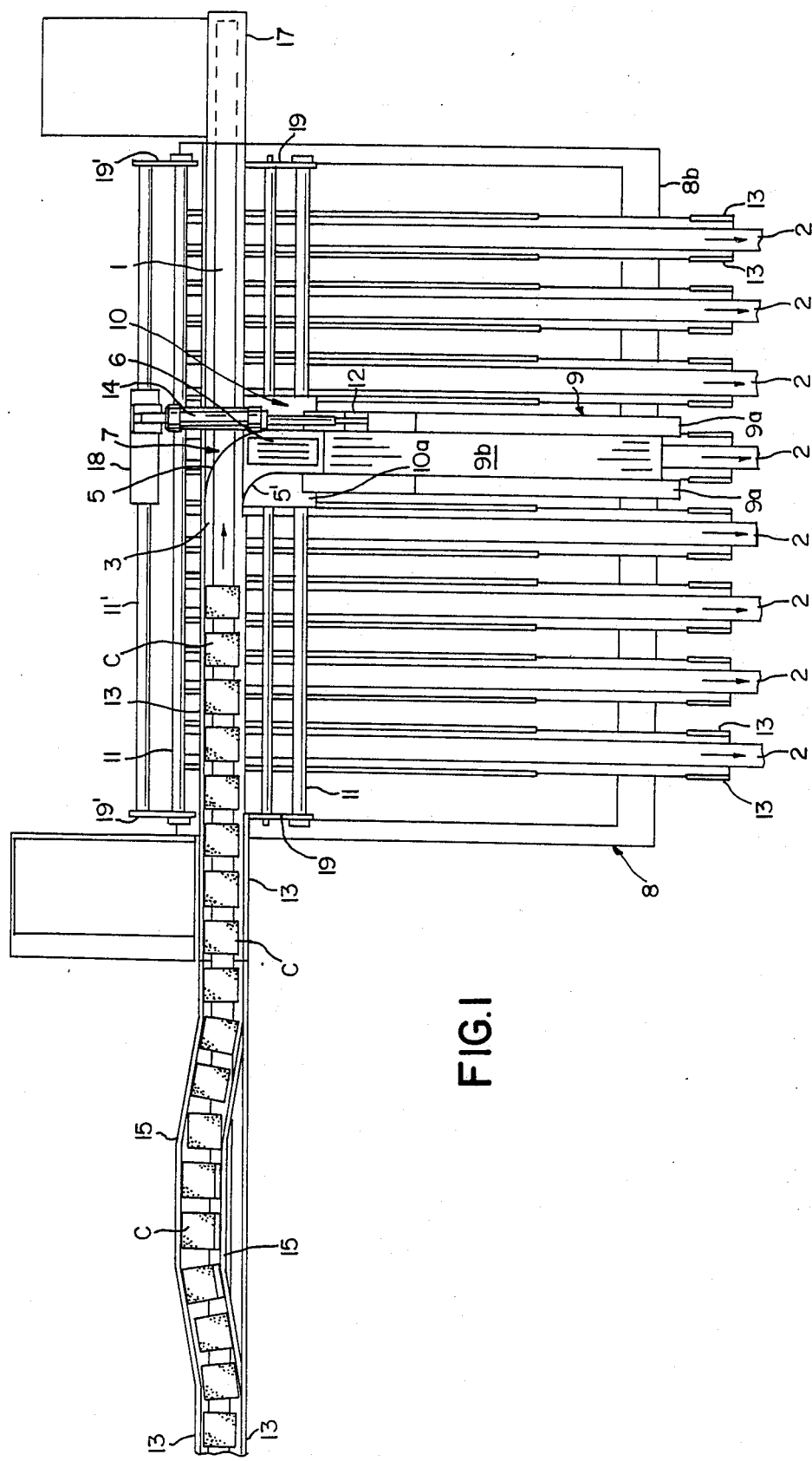
FIG. 1 is a plan view of the device according to the present invention.
Figure 2:
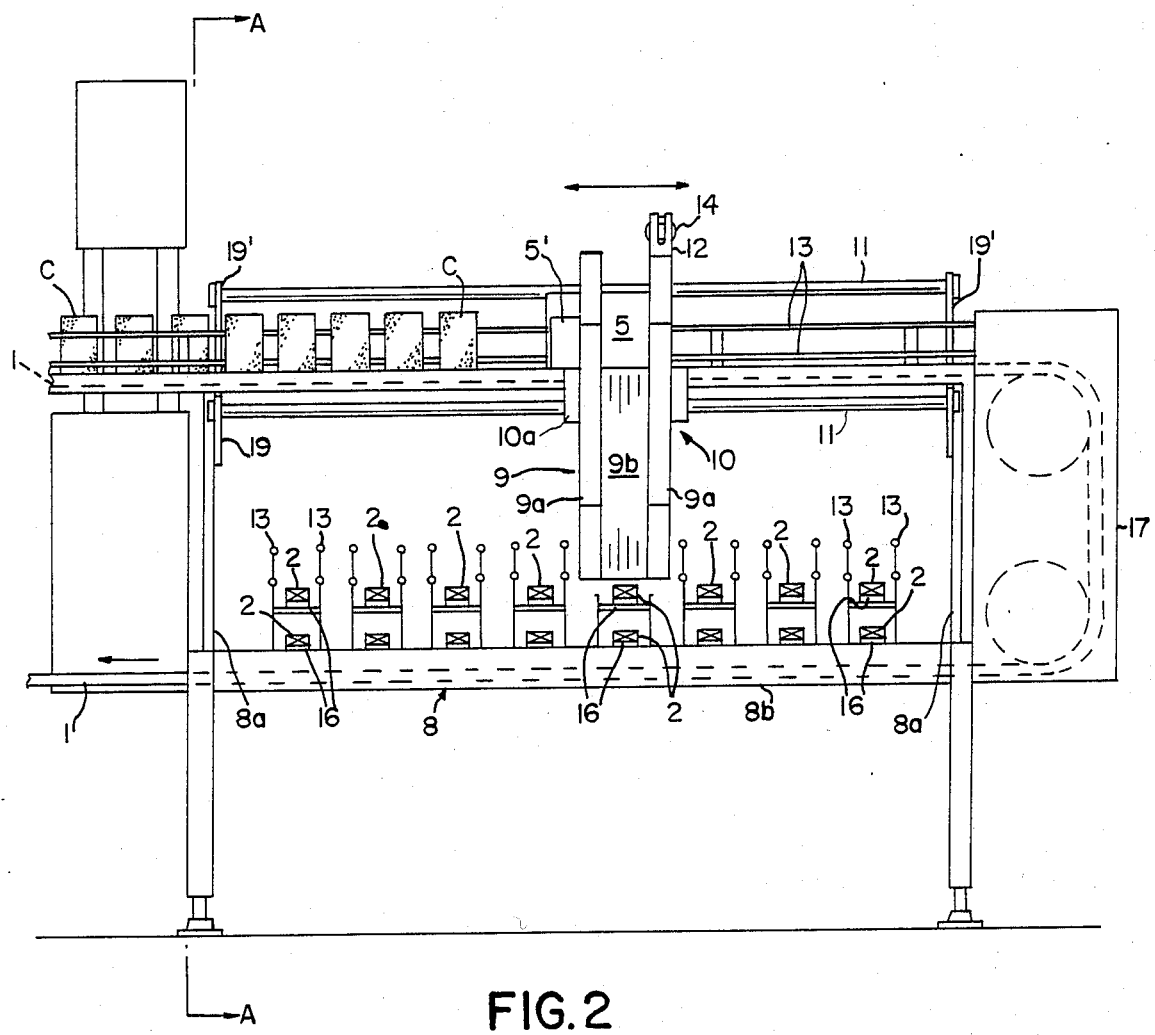
FIG. 2 is a front view of the main portion of the device of FIG. 1.
Figure 3:
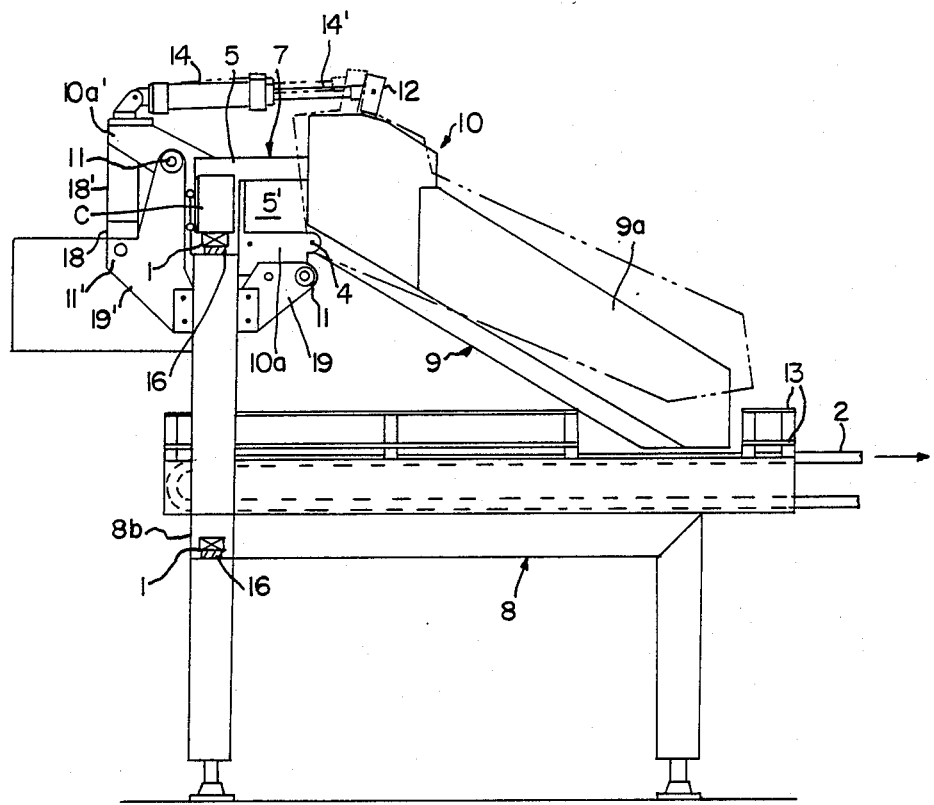
FIG. 3 is a longitudinal sectional side view taken along the line A—A in FIG. 2.

FIG. 1 is a plan view of the device according to the present invention, FIG. 2 is a front view of the main portion of the device of FIG. 1, and FIG. 3 is a longitudinal sectional side view taken along the line A—A of FIG. 2.

In the present invention, articles, for example, in the shape of a longitudinal prism made of paper packaging material so as to hold liquid foodstuff such as milk, juice, are continuously conveyed on a conveyer. A main conveyer 1 has a flat traversing surface in the form of an endless chain, though not illustrated in detail, and moves in a circle on the conveyer supporting plates 16 (see FIG. 3). The conveyer supporting plates 16 are disposed on the upper and lower stages (upper side of FIG. 1) at one side of a base frame 8 and along a passageway of the conveyer 1. The circular movement of the conveyer 1 changes the direction inside an end cover 17 which is provided on the base frame 8, and allows the conveyer to make a U-turn. The articles C are conveyed on the upper conveyer traveling over the upper stage.

A pair of girders 15 are provided along a traversing truck of the conveyer 1 before the base frame 8. The girders 15 face each other and align the side walls of the articles C forming a passageway which is partially deflected and deformed so that the side walls of the articles C are moved to one side (the left side) of the conveyer's traversing direction before returning back to the original traversing truck. The girders 15 are connected to a pair of guide pipes 13 provided on both sides of the traversing truck of the main conveyer 1.

Two stages are provided on upper and lower guide pipes 13 for restricting and guiding the articles C to the left side only of the traversinq direction along the traversing truck of the conveyer 1 and in the upper part of the base frame 8. The guide pipe 13 on the right side of the traversinq direction of the main conveyer 1 is omitted above the frame 8 so that the articles C can be sent to the other conveyers 2.

When the articles C are conveyed between the girders 15, the center of gravity deviates from the traversing surface of the conveyer 1 and the articles C tumble. Those which are short in height slip off of the left side of the girder 15 in the traveling direction and fall so that they do not enter the device.

A plurality of lines of branch conveyers 2 which also have flat traversing surfaces are disposed under the area before the terminating end of the above-mentioned traversing truck of the main conveyer 1 and above the returning passageway of the conveyer 1 or above the upper part of the girders 8b of the base frame main body 8. The conveyers 2 are parallel and closely adjoined to one another such that the direction of the conveyers 2 at the base end area of the traversing truck thereof are at a right angle to the traversing direction of the conveyer 1 which is positioned above. The conveyers 2 make a circular movement on the conveyer supporting plates 16 which comprises upper and lower stages. An article C is fed from the afore-mentioned conveyer 1 to the upper surface of the conveyer 2 by sliding down the chute 9 of the distribution unit 10 (to be described later). Then, the next article C is fed to the conveyer 2 in the same manner.

guide pipes are disposed on both sides of the traversing truck of each one of the branch conveyers 2 for restricting and guiding the direction of the articles C. Upper and lower guide bars 11 are suspended on a pair of base frames 8a which are positioned on the right and left for supporting the traversing truck of the main conveyer 1 above the base frame main body 8 such that the passageway of the conveyer 1 is interposed between the frame plates 19 and 19' provided on the respective base frame supports 8a.

A distribution unit 10 for distributing articles C onto the afore-mentioned plurality of branch conveyers 2 is provided on the guide bars 11 and 11' and is slidable to the right and left by means of sliding frame plates 10a and 10a'.

A traversing direction change-over member 7 is disposed above the sliding frame plate 10a. The traversing direction change-over member 7 includes a pair of arcuate guide plates 5 and 5' which face each other and a sliding plate 6 for sliding and guiding the articles C. The traversing direction change-over member 7 has a receiving inlet which faces and opens towards the traversing direction of the conveyer 1 for receiving the articles C so that the traversinq directions of the articles C can be changed to conform with the traversing directions of the branch conveyers 2. Thus, the articles C conveyed by the main conveyer 1 can change their direction by 90 degrees and pass over the sliding surface plate 6. A chute 9 is slidably connected by a hinge joint 4 on the sliding frame plate 10a. Accordingly, the traversing direction change-over member 7 allows the articles C to continuously slide down onto the branch conveyers 2. The chute 9 has side walls 9a on both sides of the central sliding plate 9b which face each other. A cylinder 14 is provided on an upper member 12 of the base of one side wall 9a having bolts on the upper end of the sliding frame plate 10a' which is on the opposite side of the chute 9 and locked so as to oscillate the chute 9. A driving shaft 14' of the cylinder 14 slightly lifts the chute 9 when air is blown into the cylinder 14.

As with the afore-mentioned guide bars 11, an auxiliary guide bar 11' is provided parallel to the guide bars. An auxiliary sliding member 18 is fixed to the afore-mentioned sliding frame plate 10a' which is on the opposite side of the chute 9 via a support member 18' and is slidable on the auxiliary guide bar 11'. A magnetic element is incorporated into the auxiliary guide bar 11' and the auxiliary sliding member 18 so that the magnetic elements form a rodless cylinder for electromagnetically moving the distribution unit 10 to the right and left to facilitate the distribution unit 10 in moving to the right and left. In addition, it is also possible to manually move the distribution unit 10 using the support member 18'.

In the present invention the main conveyer 1 continuously conveys the articles C, distributing and transferring the articles one after another to the various final processing stages. The articles C are conveyed to a desired branch conveyer 2 which is in turn connected to a desired final processing stage when air is blown into the cylinder 14 of the distribution unit 10 so as to lift the lower end of the chute 9 from one of the branch conveyers 2 and move it to another of the branch conveyers 2. Then the chute 9 is lowered to the surface of selected branch conveyer 2 and the articles C are fed to this branch conveyer 2 for final processing.

Depending upon the condition of the guide pipes or other circumstances, the chute 9 may be securely fixed instead of pivotable about hinge joint 4. This enables the chute 9 to move to the left and right and eliminates the need for cylinder.

As is evident from the above description the conveyer distribution and transferring system of the present invention distributes manufactured articles of a predetermined shape, such as paper packages for liquid foodstuff, to various final processing stages. This distribution-transferring system eliminates the need for a large space and provides cost-saving benefits thus greatly improving production efficiency.

I claim:

1. A distribution transferring device for articles to be conveyed incorporated in a conveyer characterized in that a plurality of lines of conveyers having flat traversing surfaces are disposed under an area before the terminating end of a traversing truck of a main conveyer which also has a flat traversing surface and is designed to convey articles of a predetermined shape, such that the directions of the traversing trucks of said plurality of conveyers at the starting ends thereof are at right angles relative to the traversing direction of said main conveyer with truck lines being spaced and closely adjoined to one another, a receiving inlet for said articles to be conveyed is opened to the opposite side to the traversing direction of said main conveyer and is provided at an area before said terminating end of said traversing truck, and a distribution unit which is equipped with a traversing direction change-over member guiding said articles at a right angle relative to said traversing direction of said main conveyer and a downwardly sloping chute in combination with said traversing direction change-over member allows said articles to be fed onto the traversing surface of any of said plurality of conveyers provided such that said distribution unit is movable parallel to said area before the terminating end of said traversing truck of said main conveyer along the section wherein said plurality of lines of said plurality of conveyers are disposed, said traversing direction changeover member is provided between said receiving inlet for said articles and said downwardly sloping chute and includes a pair of arcuate guide plates which face each other and open to the opposite direction to the traversing direction of said main conveyor and with a sliding plate adjoining the side of said main conveyor, the combination between said traversing direction change-over member and said downwardly sloping chute is made by a hinge joint so that the downwardly sloping chute may be movable in a swinging manner, said distribution unit is provided on said area before said terminating end of said traversing truck such that said distribution unit is slidable with respect to guide bars provided parallel to said terminating end thereof, and a piston-cylinder assembly having one end slidably mounted on said guide bar and a second end attached to said chute for pivoting said chute.

2. A distribution-transferring device as defined in claim 1, characterized in that the traversing truck of said main conveyer has girders for aligning the side wall of said articles along an area before a section in which said distribution unit moves.

3. A distribution-transferring device as defined in claim 1, characterized in that the traversing truck of said main conveyer has girders for aligning the side wall of said articles along an area before a section in which said distribution unit moves.

4. A distribution-transferring device as defined in claim 3, characterized in that said distribution unit is provided on said area before said terminating end of said traversing truck such that said distribution unit is slidable with respect to guide bars provided parallel to said terminating end thereof.

5. A distribution-transferring device as defined in claim 2, characterized in that said distribution unit is provided on said area before said terminating end of said traversing truck such that said distribution unit is slidable with respect to guide bars provided parallel to said terminating end thereof.

6. A distribution-transferring device as defined in claim 3, characterized in that said distribution unit is provided on said area before said terminating end of said traversing truck such that said distribution unit is slidable with respect to guide bars provided parallel to said terminating end thereof.

* * * * *

UNITED STATES PATENT AND TRADEMARK OFFICE
CERTIFICATE OF CORRECTION

PATENT NO. : 4,889,223

DATED : December 26, 1989

INVENTOR(S) : Anders Bergstrom

It is certified that error appears in the above-identified patent and that said Letters Patent is hereby corrected as shown below:

On the title page,
item [73] Assignee: Change "AB Tetra Pak, Osaka, Japan" to
--AB Tetra Pak, Lund, Sweden--

Signed and Sealed this

Sixteenth Day of October, 1990

Attest:

HARRY F. MANBECK, JR.

*Attesting Officer*    *Commissioner of Patents and Trademarks*